United States Patent [19]

Losh

[11] 4,400,005
[45] Aug. 23, 1983

[54] TRACTOR-TRAILER CONNECTOR MEANS WITH RETRACTABLE COUPLING PINS

[75] Inventor: Russell L. Losh, Rensselaer, Ind.

[73] Assignee: Talbert Manufacturing, Inc., Rensselaer, Ind.

[21] Appl. No.: 289,055

[22] Filed: Jul. 31, 1981

[51] Int. Cl.³ .............................................. B62D 53/06
[52] U.S. Cl. ............................ 280/423 B; 280/425 A; 414/481
[58] Field of Search ...................... 280/423 B, 425 A; 414/481

[56] References Cited

U.S. PATENT DOCUMENTS

| 2,952,476 | 9/1960 | Brockman | 414/481 |
| 2,953,396 | 9/1960 | Meadows | 280/423 B |
| 2,967,720 | 1/1961 | Smith et al. | 280/425 A |
| 3,027,030 | 3/1962 | Duffy | 280/423 B |
| 3,043,609 | 7/1962 | Talbert | 280/423 B |
| 3,326,572 | 6/1967 | Murray | 280/423 B |
| 3,536,340 | 10/1970 | Talbert | 280/425 A |
| 3,866,947 | 2/1975 | Yakubow | 280/425 A |
| 4,219,211 | 8/1980 | Sauers | 280/423 B |

FOREIGN PATENT DOCUMENTS

| 99597 | 6/1961 | Netherlands | 280/423 B |
| 2035239 | 6/1980 | United Kingdom | 280/423 B |

Primary Examiner—David M. Mitchell
Assistant Examiner—Kenneth R. Rice

[57] ABSTRACT

An apparatus for attaching a tractor with a trailer employing a fixed gooseneck with the gooseneck having a horizontally rearwardly inclined arm for connection with claw means and securement by a pair of dowels slidably mounted to project horizontally from the front end of the load carrying frame, with said dowels being moveable for engagement and disengagement with connecting stirrups on the tail member.

11 Claims, 6 Drawing Figures

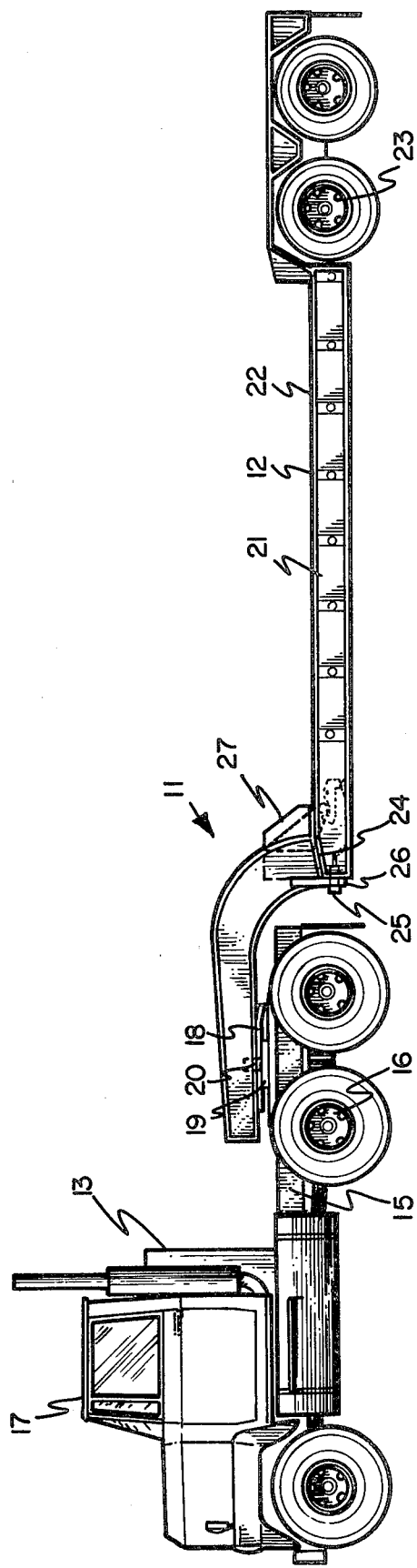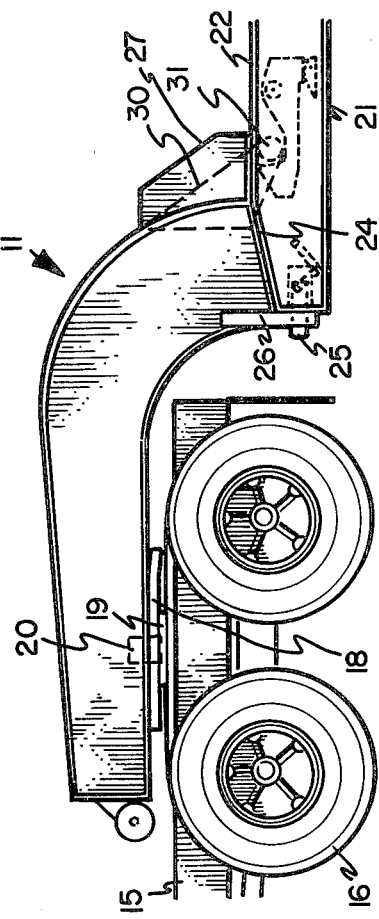

TRACTOR-TRAILER CONNECTOR MEANS WITH RETRACTABLE COUPLING PINS

BACKGROUND OF THE INVENTION

A. Field of the Invention

This invention relates to improvements in coupling means used in tractor-trailer assemblies, and more particularly, pertinent to locking mechanisms associated with hinged gooseneck devices in combination with load carrying trailer beds.

B. Description of the Prior Art

It is known that tractor and trailer assemblages are in common usage for hauling heavy articles upon low bed vehicles supported on rear wheels and carried at their forward end by gooseneck types of connecting devices. These assemblages are quite useful and are especially suited and convenient for front end loading and unloading of heavy items, including machinery, vehicles and the like.

In such tractor and trailer assemblages, it is conventional to employ a coupling device between the front end of a low bed trailer and the rear end of the gooseneck device whereby the device may be, if desired, completely disconnected from the low bed trailer while remaining connected to the tractor so that the front end of the trailer, after being lowered into contact with the ground or a supporting surface, is free and unobstructed for loading and unloading.

Upon loading or unloading the low bed trailer, the tractor along with the attached gooseneck may be aligned with the front end of the low bed trailer and have the gooseneck coupled with the trailer. Various means have been employed in the art to improve the means for coupling the gooseneck to such low bed trailers. An especially useful assembly for coupling a tractor to a trailer is, by way of example, the Hinged Assembly Device set forth in U.S. Pat. No. 3,536,340 to Talbert. This patent describes a pivotally mounted base member which can be readily connected to a low bed trailer.

A number of locking devices have been utilized in connecting the base member to the front end of the trailer. Although such devices have met with various degrees of success, there have been numerous problems associated therewith, including ease of operation and force binding of the connecting members.

Useful connecting devices are set forth in the patent literature. In particular, U.S. Pat. No. 2,952,476 to Brockman discloses coupling means employing cooperating stirrups and lugs and locking notches for engagement with the low bed trailer; U.S. Pat. No. 2,953,396 to Meadows describes a coupling device employing a locking arm and associated trailer pins that communicate with stirrup means; U.S. Pat. No. 2,967,720 to Smith et al discloses a pair of latching means for locking and securing a low bed vehicle; U.S. Pat. No. 3,027,030 to Duffy discloses a tractor-trailer draw bar coupling means employing pins and stirrups along with a moveable draw bar king pin; U.S. Pat. No. 3,043,609 to Talbert discloses a removable gooseneck draw bar having an adjustable connection with a low-bed trailer, said trailer having several connecting means in the form of connecting pins and the like; U.S. Pat. No. 3,326,572 to Murray describes a detachable gooseneck trailer device employing engaging surfaces and pins for connecting the gooseneck and trailer; U.S. Pat. No. 3,866,947 discloses a removeable gooseneck low boy trailer device employing a pair of upturned hooking means for interlocking with the front portion of the trailer; and, U.S. Pat. No. 4,219,211 to Sauers discloses a trailer connection means employing a hinged gooseneck portion having stirrups for engagement with pins affixed to the trailer and a downwardly retractable pin connected to the gooseneck for engagement with the trailer.

SUMMARY OF THE INVENTION

This invention provides a relatively simple, yet comprehensive coupling means for tractor-trailer assemblages. Moreover, this invention provides a useful connecting means which substantially reduces force binding associated with more complicated devices and is of a highly dependable construction, yet is more unitary in structure than assemblages of the type commonly utilized.

It is therefore an object of this invention to provide a safe and reliable connecting mechanism whereby coupling between the rear end of the gooseneck and the front end of a loaded or unloaded trailer may be easily and quickly effected by a single operator or attendant and which is registerable with any normal position of the front end of the trailer, which may be horizontal or inclined to a ground or support engaging position.

It is a further object of this subject invention to provide in a tractor-trailer coupling assemblabe whereby the rear end of a gooseneck may be easily and readily connected together as well as taken apart from the front end of a low bed trailer.

It is still another object of this invention to provide a generally improved and readily detachable gooseneck tractor-trailer connecting mechanism.

It is yet another object of this invention to provide an improved tractor-trailer coupling device as described herein, which device is of simple construction, is adaptable to conventional gooseneck devices, especially fixed assembly device, is automatic in its operation, is safe to use, and is well adapted to the purposes described.

These together with other objects and advantages which will become subsequently apparent reside in the details of construction and operation as more fully hereinafter described.

BRIEF DESCRIPTION OF THE DRAWINGS

The accompanying drawings illustrates a complete embodiment of the invention according to the best mode so far devised for the practical application of the principles thereof and in which:

FIG. 1 is a side elevation view of a tractor and trailer unit of the low-bed type employing the connecting assembly of this invention in a preferred transporting position;

FIG. 2 is a side elevation view of a modified fixed or removable gooseneck connected to the front end of a trailer in accordance with this invention;

DESCRIPTION OF THE INVENTION

Figure 3:
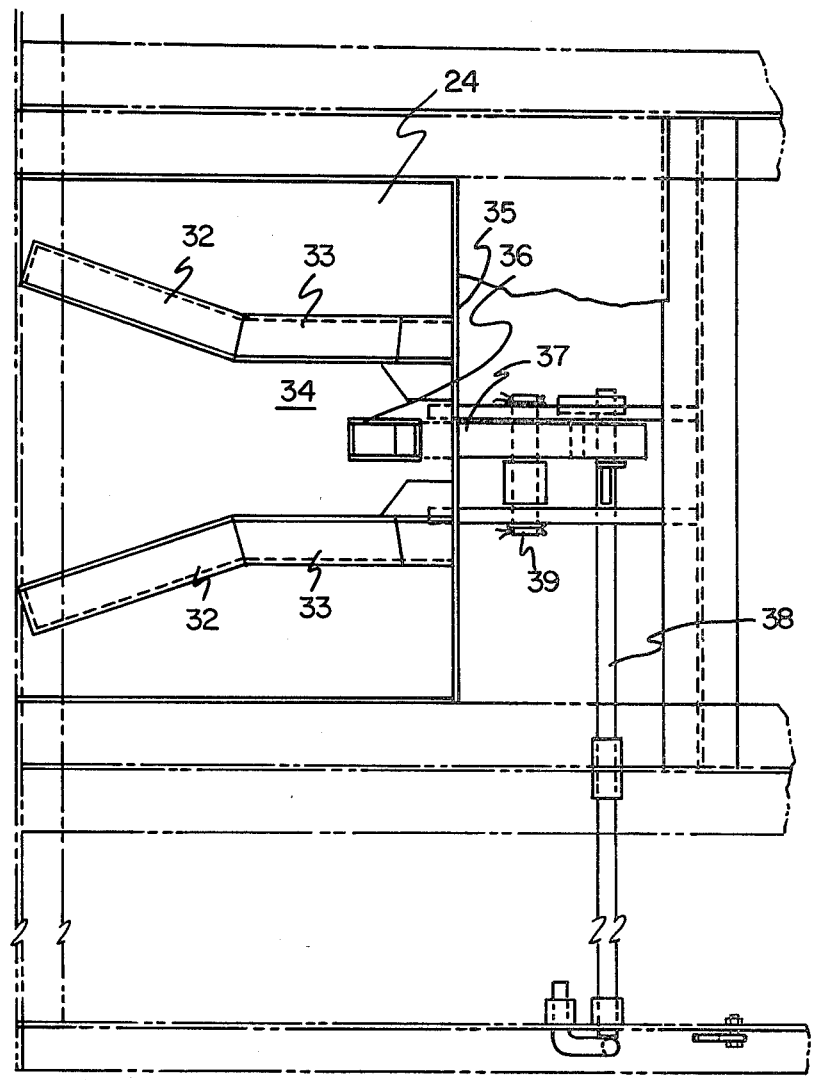
FIG. 3 is a partial top view of the guide means and latching means in accordance with this invention.

Referring now to the drawings, the numeral 11 refers generally to a removable gooseneck assembly of this invention which, as shown in FIG. 1, is utilized in connecting a low-bed type trailer 12 to a tractor 13. Tractor 13 may be a conventional tractor and includes a frame 15, wheels 16 and a cab 17. Frame 15 has a fifth wheel 18 supported on turn unions 19 rearwardly of the cab so that the fifth wheel can pivot about a horizontal axis extending transversely of the tractor, as is conventional. As is well known in the art, fifth wheel 18 has an opening (not shown) therein to receive king pin 20 (positioned on the underside of the front portion of the gooseneck assembly 11) which is locked in position by a conventional locking mechanism (not shown).

Trailer 12 has an elongated low body 21 with a flat horizontal deck 22 and wheels 23 at the rear. The front section 24 of the deck 22 of the trailer slopes forwardly and downwardly. Since heavy equipment is commonly loaded and unloaded from the front of the trailer while the front engages the ground, this sloping portion is obviously advantageous. In addition, a pair of retractable pins 25 extend forwardly from the front of the trailer below the deck 22, said pins being adapted to be releaseably engageable with depending stirrups 26 and are slidably mounted within a housing within the front portion of the trailer. Further, gooseneck 11 is also provided with a tail member 27 (at the downwardly extending rear portion of the gooseneck) which engages the upper side of deck 22.

Figure 4:
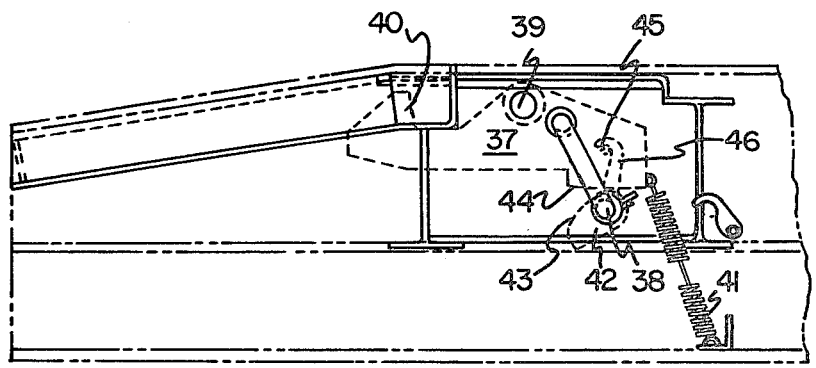
FIG. 4 is a partial side view of the guide means and latching means in accordance with this invention.

As best shown in FIG. 2, tail member 27 is shown in a cut away view to illustrate that member 27 comprises two spaced apart plates 30 that are secured to the rear portion of gooseneck 11 and have a metal bar, or keeper, 31 therebetween. As best shown in FIGS. 2, 3 and 4, the front section of trailer 12 is provided with guide walls 32 which converge upwardly into upper side walls 33 and are coextensive therewith, said side walls being substantially parallel to one another and terminate at a back wall 35 to define an enclosure, or bin, 34. The floor of the enclosure, or bin, 34 is provided with a large aperture 36.

Secured to the front portion of the body 21 of trailer 12 is a latching means, or claw, designated generally by the numeral 37, and as shown best in FIG. 4, the latching means is pivotly mounted to body 21 of trailer 12 by means of coupling rod 39. As shown in FIGS. 3 and 4, latching means 37 is secured beneath and within the upper side walls of the body 21 of the trailer and is adapted to swing and project through aperature 36 so that coupling surface 40 can engage keeper 31. As shown, spring 41 biases surface 40 of claw 37 toward engagement with keeper 31. The latching means 37 is associated with cam 42 which has a bearing surface 43 and is situated beneath latching means 37 and engageable therewith at the distal surface 44 or latching means 37. Cam 42 is mounted to body 21 of trailer 12 by rod number 38 which extends transversely of the deck 22. Also mounted to rod member 38 is a hook 46 that swings and is engageable with snap 45 intrinsically formed on latching means 37. FIG. 4 shows latching means 37 in a position such that coupling surface 40 can be in engagement with bar 31 of tail member 27.

As noted in FIG. 2, rear portion of gooseneck 11 slopes downwardly and forwardly to match the slope of the front edge portion 24 of the deck 22 whereby the tail member 27 is received between the converging side walls 32 and side walls 33 so that keeper 31 is positioned directly over the aperture 36 for engagement with the latching means, or swinging claw, 37.

Figure 5:
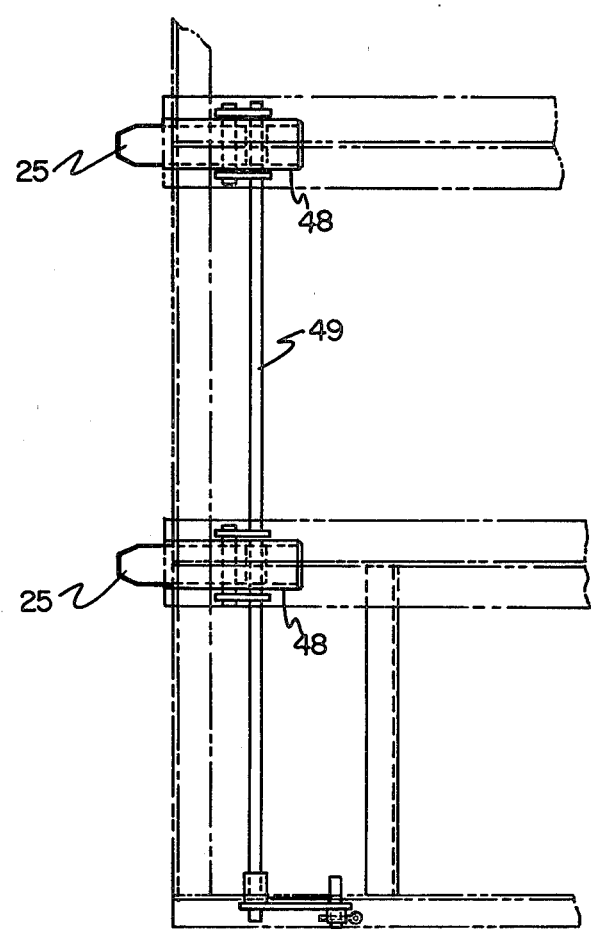
FIG. 5 is a partial top view of the retractable connecting means in accordance with this invention.
Figure 6:
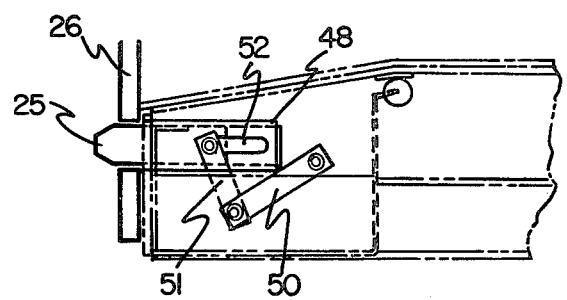
FIG. 6 is a partial side view of the retractable connecting means in accordance with this invention.

The front portion of body 21 of trailer 12 is provided with two spaced apart retractable pins 25 that are slideably mounted in a cylindrical housing 48, as shown best in FIGS. 5 and 6. The pins 25 are substantially cylindrical rods having a truncated face for ease of engagement and disengagement with stirrups 26. Pins 25 may be projected from their housings into engagement with stirrups 26 by an activating mechanism which includes shaft 49 and cooperating members 50 and 51 which engage a slot portion 52 within pin 25. Rotation of the shaft 49 causes members 50 and 51 to urge pin 25 in a forward position to engage stirrups 26 whereas further rotation of shaft 49 causes pin 25 to be slid backward within its housing and to cause disengagement with stirrup 26.

In operation, a tractor, positioned and aligned with the low bed trailer and to be connected therewith, is brought into engagement with the guide means and the sloping surface and is positioned so that the bar, or keeper, is directly over the aperture. At this same time, pins 25 are activated and slid forward to be received in the stirrups. Concurrent therewith the swinging claw is brought through the aperture and into engagement with the keeper (by rotating cam 42). To uncouple the actuating mechanism, the pins are disengaged and the front end of the trailer bed is allowed to make contact with the ground while maintaining the latching means about the keeper. When the low-bed trailer is thus lowered, cam 42 is rotated to remove the swinging claw, or latch, from engagement with the keeper whereby the gooseneck is completely disconnected from the trailer. The gooseneck and trailer may be pulled forward in order to completely disconnect the same from the trailer.

It is to be realized that this invention is not meant to be restricted to the particular embodiment thereof herein shown and described. Moreover it is not essential that all the features of the invention be used conjointly, since they may be employed advantageously in various combinations and subcombinations.

I claim that:

1. A mechanism for releasably connecting a load-carrying frame with a tractor in which the load-carrying frame is supported at its rear by wheels rotatably mounted on an axle about which the forward end portion of the frame may be raised and lowered and in which the tractor is provided with a fifth wheel, said mechanism comprising:
   a gooseneck between said tractor and said frame, said gooseneck having a horizontally disposed arm adapted to be connected at its forward end portion to said fifth wheel, and an inclined portion extending from said arm to form a rearward end portion thereof;
   a tail member attached centrally to said rearward end portion and defining an engaging keeper;
   a pair of stirrups connected to said rearward end portion, each of said stirrups being provided with an opening, and said stirrups being spaced apart and on each side of said tail member;
   the front section of said load-carrying frame having an aperture disposed on the upper side thereof;
   claw means mounted on said front section proximate said aperture, said claw means including a hook-shaped engaging member pivotally mounted to said frame to extend through said aperture for attachment and detachment to said keeper;
a pair of dowels slidably mounted to project horizontally from said front end of said load-carrying frame, said dowels being spaced apart and laterally situated from said claw means, with said pair of dowels being in alignment so as to engage and disengage the openings of said stirrups;
means for activating said pair of dowels for engagement and disengagement of the same from said stirrups, and
means connected to said frame for activating said claw means to couple and uncouple with said keeper.

2. The mechanism of claim 1 wherein said tail member comprises a horizontal bar, and tail plates spaced apart and secured to said rearward end portion of said gooseneck, said tail plates extending outwardly from said rearward end portion and retaining said engaging keeper.

3. The mechanism of claim 1 wherein said mechanism includes guide means attached to said front portion of said load-carrying frame for receiving said tail member.

4. The mechanism of claim 3 wherein said guide means comprises converging side walls the widest part of which is at the front of said trailer bed, said guide means sloping upwardly from the front of said trailer bed toward said aperture in the floor of said trailer bed, and said guide means including a bin structure defined about said aperture and having a back wall and two side panels connected therewith, with said side panels being coextensive with said converging side walls and being substantially parallel to one another.

5. The mechanism of claim 1 wherein said claw means includes a snap assembly having a swinging hook means, a transverse rod rotatably mounted to said trailer bed and having attached thereto said hook means, and a retaining pin affixed to said claw means for engagement therewith whereby said snap assembly is in locking position concurrently with activation and engagement of said claw means.

6. In a trailer assembly including a trailer bed and a gooseneck having a first end adapted for engagement to a fifth wheel of a tractor and a rear end for engagement with the front section of the trailer bed, a coupling mechanism comprising:
a tail member attached to said rear end of said gooseneck, said tail member defining an engaging keeper;
a pair of stirrups connected to said rear end of said gooseneck, each of said stirrups being provided with an opening, and said stirrups being affixed on each side of said tail member;
the rear section of said trailer bed being provided with ground-engaging wheels disposed thereon in supporting relationship;
the front section of said trailer bed having an aperture disposed on the upper side thereof;
latch means including a latching surface extendable through said aperture for attachment to said keeper;
a pair of dowels slidably mounted to extend horizontally from said front section of said trailer bed, said dowels being spaced apart and laterally situated from said latch means, with said pair of dowels being in alignment to engage and disengage with said stirrups;
means connected through said frame for activating said latch means to couple with said keeper; and
means for activating said pair of dowels for engaging and disengaging the same from said stirrups.

7. In a trailer assembly including a trailer bed and a gooseneck having a front end adapted for engagement to a fifth wheel of a tractor and a rear end adopted for engagement with the front section of a trailer bed, a coupling mechanism comprising:
a tail member attached centrally to said rear end of said gooseneck, said tail member defining an engaging bar;
a pair of stirrups connected to said rear end of said gooseneck, each of said stirrups being provided with an opening, and said stirrups being affixed on each side of said tail member;
said rear section of said trailer bed being provided with ground-engaging wheels disposed thereon in supporting relationship;
said front section of said trailer bed having an aperature disposed on the upper side thereof;
guide means having side walls affixed to said upper side and soping upwardly, said guide means being complementary to said tail member and engageable therewith;
claw means mounted internally in said front section and proximate said aperture, said claw means including a hook-shaped engaging member pivotly mounted to said frame to extend through said aperture for attachment and detachment with said bar;
a pair of dowels slidably mounted to project horizontally from said front end of said trailer bed, said dowels being spaced apart and laterally situated from said claw means, and said pair of dowels being in alignment so as to engage and disengage the openings of said stirrups;
means for activating said pair of dowels for engagement and disengagement therewith; and
means connected to said frame for activating said claw means to couple and uncouple said engaging bar.

8. The coupling mechanism of claim 6 wherein said latch means further includes a snap assembly having a swinging hook means, a transverse rod rotatably mounted to said trailer bed and having attached thereto said hook means, and a retaining pin affixed to said latch means for engagement therewith whereby said snap assembly is in locking position concurrently with activation and engagement of said latch means.

9. In a tractor-trailer combination including a trailer having a body, which includes a bed and a floor, and wheel means supporting the rear end of the body, a tractor having an upwardly exposed fifth wheel assembly mounted thereon, and a gooseneck detachably connected at its higher portion to said fifth wheel assembly and at its lower portion to the front end of said body, connecting means, comprising:
a tail member attached to the lower portion of said gooseneck, said member having spaced apart sections and a bar secured therebetween;
a pair of stirrups connected to said lower portion, each of said stirrups being provided with an opening, and said stirrups being spaced apart on each side of said tail member;
said front section of said body having an aperture disposed on the upper side thereof;
claw means mounted on said front section proximate said aperture, said claw means including a hook-shaped engaging member portably mounted to said body to extend through aperture for attachment and detachment to said bar;

a pair of dowels slidably mounted to project horizontally from said front end of said body, said dowels being spaced apart and laterally situated from said claw means, and said pair of dowels being in alignment so as to engage and disengage the openings of said stirrups;

means for activating said pair of dowels for engagement and disengagement of the dowels from said stirrups; and means connected to said body for activating said claw means to couple and uncouple with said bar.

10. The connecting means of claim 9 wherein said connecting means includes guide means attached to said trailer for receiving said tail member.

11. The connecting means of claim 10 wherein said guide means includes converging side walls the widest part of which is toward the front of said bed, said guide means sloping upwardly from the front of said bed toward said aperture in the floor of said trailer, and said guide means further including a bin structure defined about said aperture and having a back wall and two side panels connected therewith, with said side panels being coextensive with said converging side walls and being substantially parallel to one another.

* * * * *